(12) United States Patent
Tanizawa et al.

(10) Patent No.: US 9,283,941 B2
(45) Date of Patent: Mar. 15, 2016

(54) VACUUM BOOSTER FOR A VEHICULAR BRAKE

(75) Inventors: Kiyoaki Tanizawa, Ueda (JP); Kentaro Yoshizawa, Ueda (JP)

(73) Assignee: NISSIN KOGYO CO., LTD., Nagano (JP)

( * ) Notice: Subject to any disclaimer, the term of this patent is extended or adjusted under 35 U.S.C. 154(b) by 679 days.

(21) Appl. No.: 13/488,939

(22) Filed: Jun. 5, 2012

(65) Prior Publication Data

US 2012/0304849 A1 Dec. 6, 2012

(30) Foreign Application Priority Data

Jun. 6, 2011 (JP) ................................. 2011-126406

(51) Int. Cl.
*B60T 13/567* (2006.01)
*B60T 13/565* (2006.01)

(52) U.S. Cl.
CPC ............. *B60T 13/567* (2013.01); *B60T 13/565* (2013.01)

(58) Field of Classification Search
CPC .. B60T 13/565; B60T 13/567; B60T 13/5675
USPC ................... 92/169.2, 169.3, 169.4; 60/547.1
See application file for complete search history.

(56) References Cited

U.S. PATENT DOCUMENTS

| | | | | |
|---|---|---|---|---|
| 2,976,847 A | * | 3/1961 | Rockwell | 91/372 |
| 3,040,535 A | * | 6/1962 | Randol et al. | 60/554 |
| 3,065,603 A | * | 11/1962 | Randol | 60/553 |
| 3,146,682 A | * | 9/1964 | Price et al. | 92/99 |
| 3,442,182 A | * | 5/1969 | Eustace | 92/99 |
| 4,445,331 A | * | 5/1984 | Weiler et al. | 60/547.1 |
| 4,466,246 A | * | 8/1984 | Furuta et al. | 60/547.1 |
| 4,614,149 A | * | 9/1986 | Omi | 92/98 D |
| 4,726,189 A | * | 2/1988 | Arino et al. | 60/547.1 |
| 4,807,521 A | * | 2/1989 | Uyama et al. | 92/169.1 |
| 5,195,421 A | * | 3/1993 | Shinohara et al. | 92/161 |
| 5,211,018 A | * | 5/1993 | Shinohara et al. | 60/547.1 |
| 5,537,821 A | * | 7/1996 | Sunohara et al. | 60/547.1 |
| 5,862,736 A | * | 1/1999 | Takaku | 91/369.1 |

FOREIGN PATENT DOCUMENTS

| | | | |
|---|---|---|---|
| CN | 101415591 A | | 4/2009 |
| CN | 102039887 A | | 5/2011 |
| GB | 1231365 | * | 5/1971 |

(Continued)

OTHER PUBLICATIONS

JP200776437A Machine translation to English, full contents. 2014.*

(Continued)

*Primary Examiner* — Edward Look
*Assistant Examiner* — Michael Quandt
(74) *Attorney, Agent, or Firm* — Andrew M. Calderon; Roberts Mlotkowski Safran & Cole, P.C.

(57) ABSTRACT

In a vacuum booster for a vehicular brake, at least one of flat front attachment portion and flat rear attachment portion has a central disc portion which is concentric with a fitting cylindrical portion and plural side disc portions which are disposed around the central disc portion so as to be continuous with the central disc portion and to be spaced from each other. Bolts are inserted through at least a pair of side disc portions of the plural side disc portions.

17 Claims, 7 Drawing Sheets

(56) References Cited

FOREIGN PATENT DOCUMENTS

Figure 1:
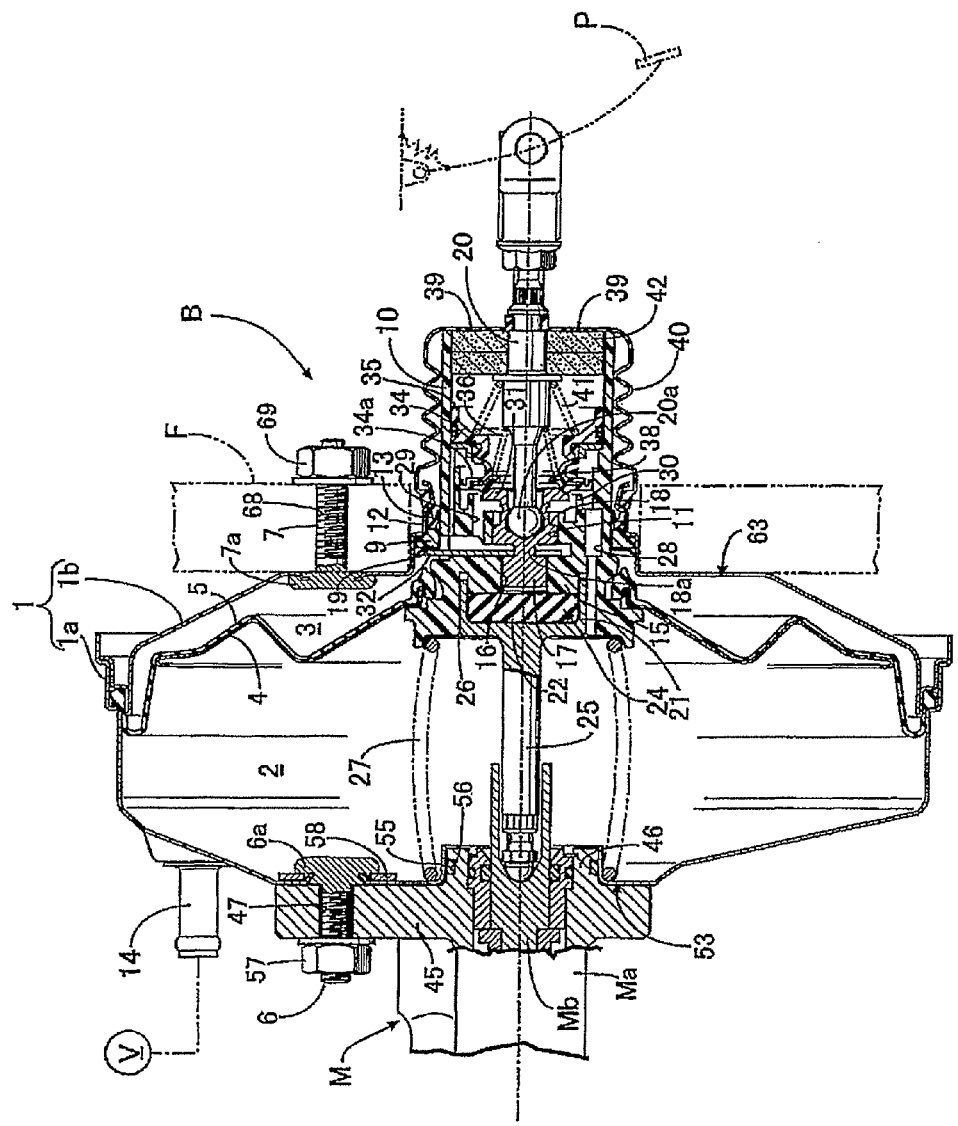

| | | |
|---|---|---|
| JP | 05278599 | 10/1993 |
| JP | 2002046593 A | 2/2002 |
| JP | 2004136741 | 5/2004 |
| JP | 3759451 B2 | 3/2006 |
| JP | 200776437 A * | 3/2007 |

OTHER PUBLICATIONS

NPL—Macmillan online dictionary. Portion. Retrieved Jun. 13, 2015.*
Japanese Patent Office Action for Application No. 2011-126406, drafting date—Apr. 12, 2013, 5 pages.
Chinese Office Action and Search Report for Related Application No. 2012-101821783, dated Aug. 22, 2014, 14 pages.

* cited by examiner

VACUUM BOOSTER FOR A VEHICULAR BRAKE

CROSS REFERENCE TO RELATED APPLICATION(S)

The present disclosure relates to the subject matters contained in Japanese Patent Application No. 2011-126406 filed on Jun. 6, 2011, which are incorporated herein by reference in its entirety.

FIELD

One or more embodiments of the present invention relate to a vacuum booster for a vehicular brake which is used for operating a master cylinder in a boosted manner. In particular, the embodiments relate to a vacuum booster for a vehicular brake in which a front shell half which is shaped like a bowl opened on the rear side and has a flat front attachment portion screwed to a rear flange of a cylinder body of a master cylinder and a rear shell half which is shaped like a bowl opened on the front side and has a flat rear attachment portion screwed to a vehicle body are connected to each other to form a booster shell, a fitting cylindrical portion which is fitted with a rear end portion of the cylinder body is integral with the front shell half and extends rearward from a central portion of the front attachment portion, and a support cylindrical portion which is disposed concentrically with the fitting cylindrical portion so as to slidably support a valve cylinder which is connected to central portions of a booster piston housed in the booster shell so as to be able to reciprocate in the front-rear direction and a diaphragm laid on and joined to a rear surface of the booster piston is integral with the rear shell half and extends rearward from a central portion of the rear attachment portion.

BACKGROUND

This type of vacuum booster for a vehicular brake is known from JP-B-3759451 etc. In this type of vacuum booster, the front shell half is formed with, in an integral manner, a cylindrical circumferential wall whose rear end portion is connected to the rear shell half, an end wall which is continuous with the front end of the circumferential wall and whose diameter decreases as the position goes forward, a flat attachment portion which is continuous with the front end of the end wall, and a fitting cylindrical portion which extends rearward from a central portion of the attachment portion so as to be able to be fitted with the rear end portion of the cylinder body of the master cylinder. A connection portion of the attachment portion and the end wall is stepped in an imaginary cross section including the axial lines of the pair of bolts for screwing the front shell half to the flange of the cylinder body, and the end wall is straight in a cross section that is perpendicular to the above imaginary cross section. The strength of the front shell half is increased in this manner.

However, in the shell structure disclosed in JP-B-3759451, the flat attachment portion basically has a rhombic shape whose four corners are rounded. When local tensile loads act on the bolts by which the attachment portion is screwed to the flange of the cylinder body, the attachment portion may be deformed plastically because the areas of the flat portions around the bolt screwing portions are relatively large. To prevent this phenomenon, it is necessary to set the attachment portion relatively thick, resulting in weight increase.

SUMMARY

The present invention has been made in the above circumstances, and an object of the present invention is therefore to provide a vacuum booster for a vehicular brake in which at least one of the screwing portion of the front shell half for screwing to the master cylinder and that of the rear shell half for screwing to the vehicle body is made thinner to attain weight reduction while its strength is kept high.

According to a first aspect of the embodiments of the present invention, there is provided a vacuum booster for a vehicular brake, the booster including: a booster shell (1) including a front shell half (1a) and a rear shell half (1b), the front shell half (1a) being shaped like a bowl opened on a rear side and having a flat front attachment portion (53) screwed to a rear flange (45) of a cylinder body (Ma) of a master cylinder (M), the rear shell half (1b) being shaped like a bowl opened on a front side and having a flat rear attachment portion (63) screwed to a vehicle body (F), the front shell half (1a) and the rear shell half (1b) being connected to each other; a fitting cylindrical portion (55) which is fitted with a rear end portion of the cylinder body (Ma), is integral with the front shell half (1a), and extends rearward from a central portion of the flat front attachment portion (53); a booster piston (4) housed in the booster shell (1) so as to be able to reciprocate in a front-rear direction; a diaphragm (5) laid on and joined to a rear surface of the booster piston (4); a valve cylinder (10) connected to central portions of the booster piston (4) and the diaphragm (5); and a support cylindrical portion (12) which is disposed concentrically with the fitting cylindrical portion (55) so as to slidably support the valve cylinder (10), is integral with the rear shell half (1b) and extends rearward from a central portion of the flat rear attachment portion (63), wherein at least one of the flat front attachment portion (53) and the flat rear attachment portion (63) has a central disc portion (53a, 63a) which is concentric with the fitting cylindrical portion (55) and plural side disc portions (53b; 63b, 63c) which are disposed around the central disc portion (53a, 63a) so as to be continuous with the central disc portion (53a, 63a) and to be spaced from each other; and wherein bolts (6, 7) are inserted through at least a pair of side disc portions (53b, 63c) of the plural side disc portions (53b; 63b, 63c).

According to a second aspect of the embodiments of the present invention, the booster may include plural link portions (53c) which link the plural side disc portions (53b) to the central disc portion (53a), each of the plural link portions (53c) being narrowed so that edges of the link portion are made closer to each other.

According to a third aspect of the embodiments of the present invention, each of the plural link portions (53c) may be narrowed in such a manner that the edges are curved gently.

According to a fourth aspect of the embodiments of the present invention, the booster may further include ring-shaped reinforcement plates (58) which are concentric with the bolts (6) inserted through the side disc portions (53b), respectively, and may be fastened to inner surfaces of the side disc portions (53b), respectively, wherein perimeter shapes of the side disc portions (53b) include portions following at least portions of perimeter shapes of the reinforcement plates (58), respectively.

According to a fifth aspect of the embodiments of the present invention, the front attachment portion (53) may be screwed to the flange (45) by a pair of bolts (6) whose center axes are located on a diameter line (La) of the fitting cylindrical portion (55), the front shell half (1a) may be formed with a flat pipe attachment portion (70) which is disposed on the diameter line (La) outside one of the pair of side disc portions (53b) and a flat neck portion (71) which is narrower than the side disc portion (53b) and the pipe attachment portion (70) and links the one side disc portion (53b) to the pipe attachment portion (70), in such a manner that front surfaces of the pipe attachment portion (70) and the neck portion (71) are flush with the front surface of the front attachment portion (53), and a proximal end portion of a vacuum pressure introduction pipe (14) for introducing vacuum pressure into a vacuum pressure room (2) formed between the front shell half (1a) and a combination of the booster piston (4) and the diaphragm (5) may be fastened to the pipe attachment portion (70).

In the first aspect, in the flat attachment portion which is screwed to the rear flange of the master cylinder, the plural side disc portions which are disposed around the central disc portion so as to be spaced from each other are continuous with the central disc portion which is concentric with the fitting cylindrical portion. And bolts are inserted through at least two of the plural side disc portions. Therefore, when local tensile loads act on the bolts which are inserted through the side disc portions, plastic deformation of the side disc portions can be minimized because the areas of the flat portions around the bolt screwing portions, that is, the areas of the side disc portions, are small. Therefore, the weight of the front shell half, and hence the booster shell, can be reduced while the strength of the attachment portion, that is, the front shell half, is kept high.

In the second aspect, the plural side disc portions are linked to the central disc portion by the narrowed link portions, respectively. Therefore, the areas of the flat portions around the bolt screwing portions, that is, the areas of the side disc portions, are made even smaller and plastic deformation of the side disc portions can be prevented more effectively.

According to the third aspect, since each link portion is narrowed so as to form gently curved edges, the strength of the link portions which link the side disc portions to the central disc portion can be made high.

In the fourth aspect, the ring-shaped reinforcement plates which are concentric with the bolts are fastened to the inner surfaces of the side disc portions, respectively, and the side disc portions are formed in such a manner that their outer perimeters coincide with those of the reinforcement plates, respectively, when viewed perpendicularly to the attachment portion. Therefore, the areas of the flat portions adjacent to the reinforcement plates are minimized while the strength of the side disc portions is made even higher by the reinforcement plates. Plastic deformation of the side disc portions can thus be prevented effectively.

In the fifth aspect, the front shell half is formed with the flat pipe attachment portion which is disposed on the straight line passing through the center axes of the pair of bolts and outside one of the pair of side disc portions of the attachment portion and the flat neck portion which is narrower than the side disc portions and the pipe attachment portion and links the one side disc portion to the pipe attachment portion, in such a manner that the front surfaces of the pipe attachment portion and the neck portion are flush with the front surface of the attachment portion. The proximal end portion of the vacuum pressure introduction pipe is fastened to the pipe attachment portion. Therefore, when a local tensile load acts on the vacuum pressure introduction pipe, plastic deformation of the pipe attachment portion can be minimized because the area of the flat portion around the attachment portion, to which the vacuum pressure introduction pipe is attached, of the front shell half, that is, the area of the pipe attachment portion, is small. Therefore, the weight of the front shell half, and hence the booster shell, can be reduced while the strength of the front shell half is kept high.

DETAILED DESCRIPTION OF THE EMBODIMENTS

Figure 2:
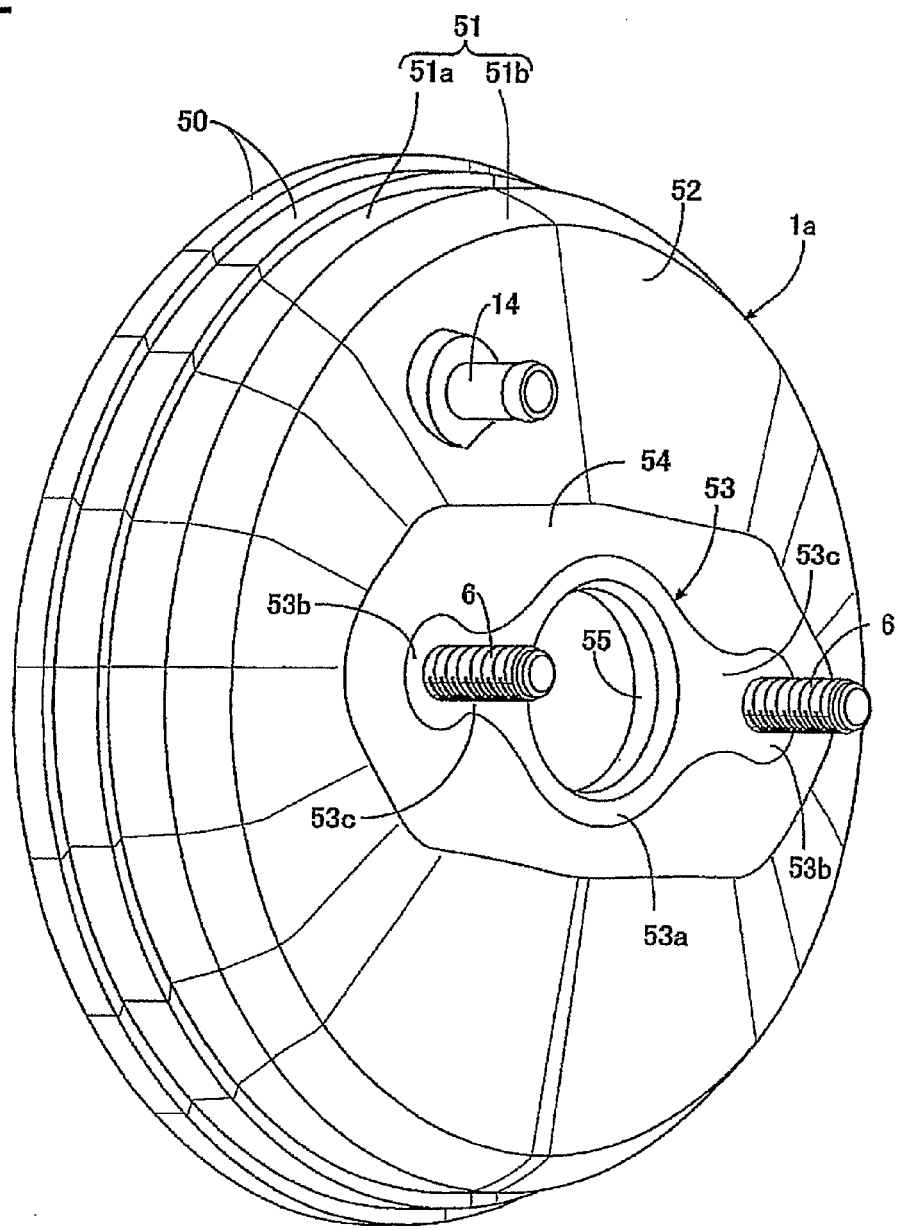
Figure 3:
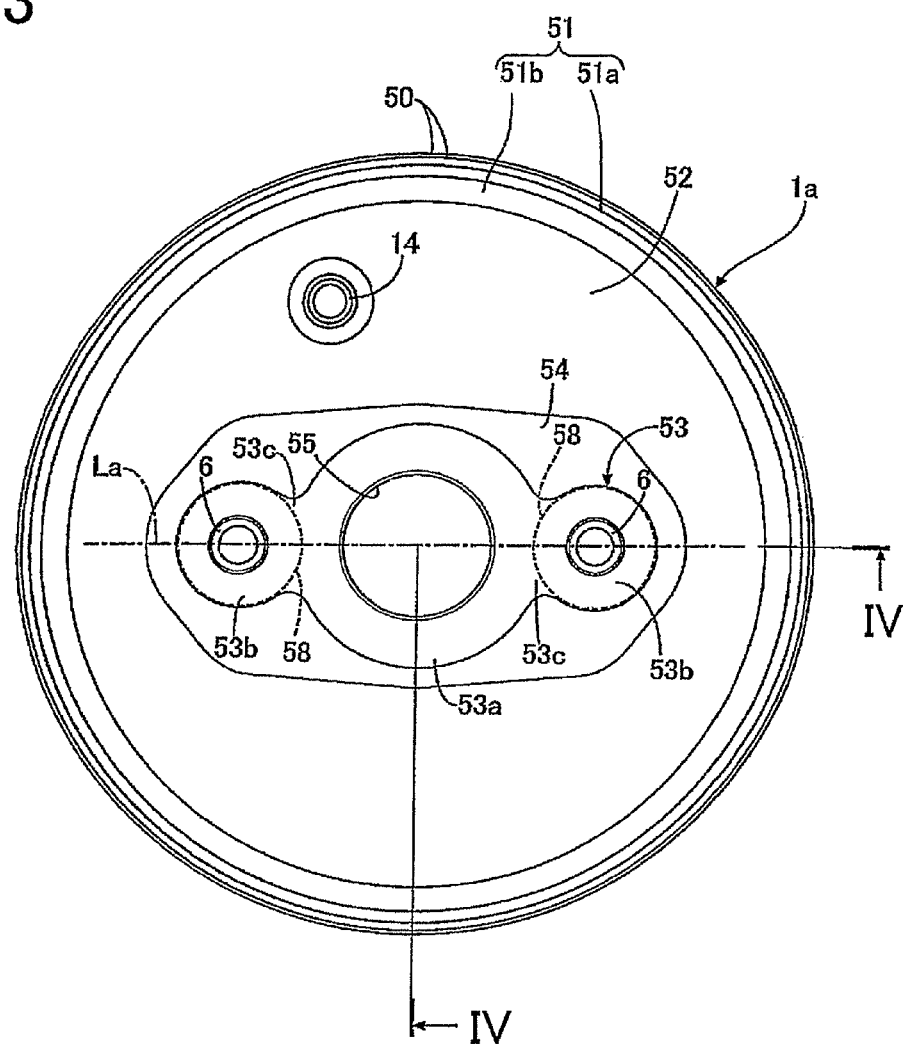
Figure 4:
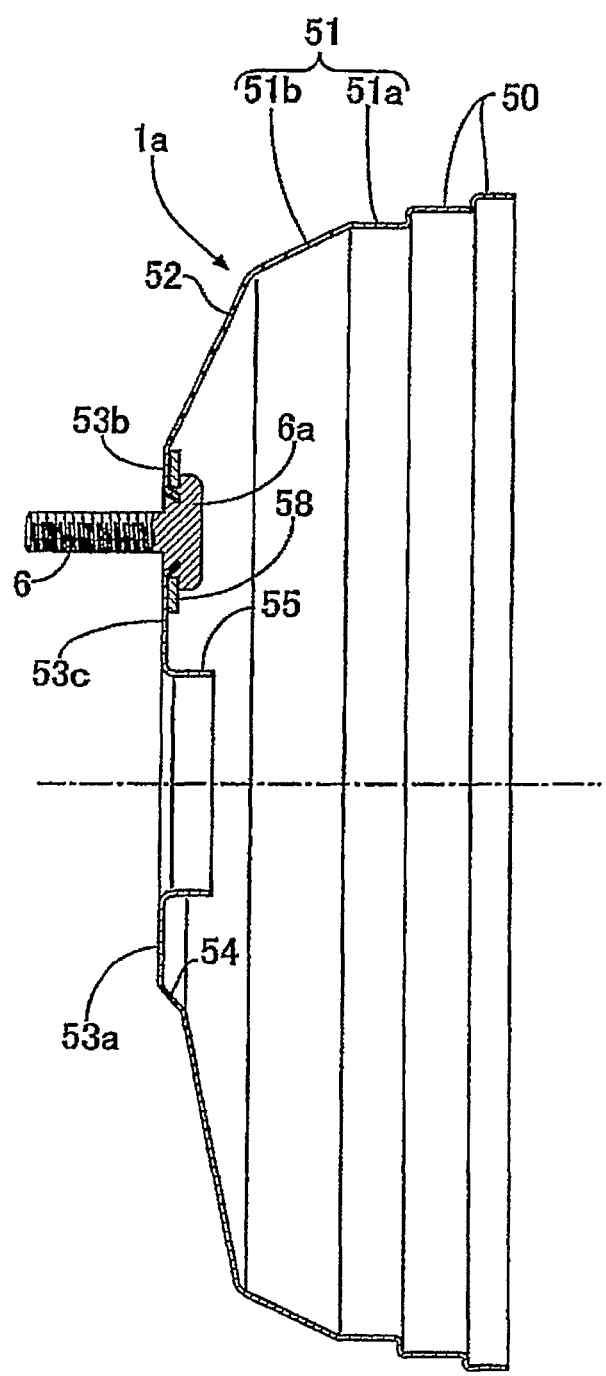
Figure 5:
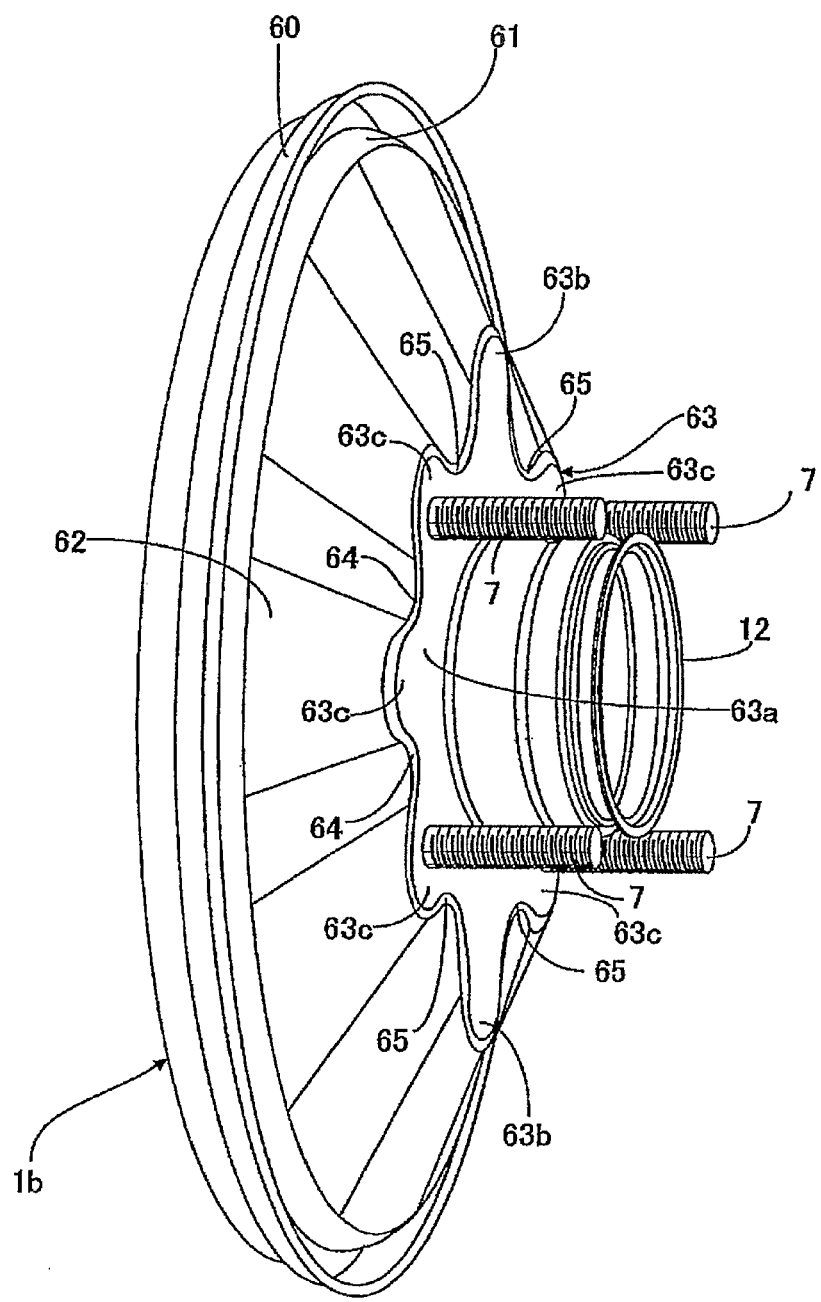
Figure 6:
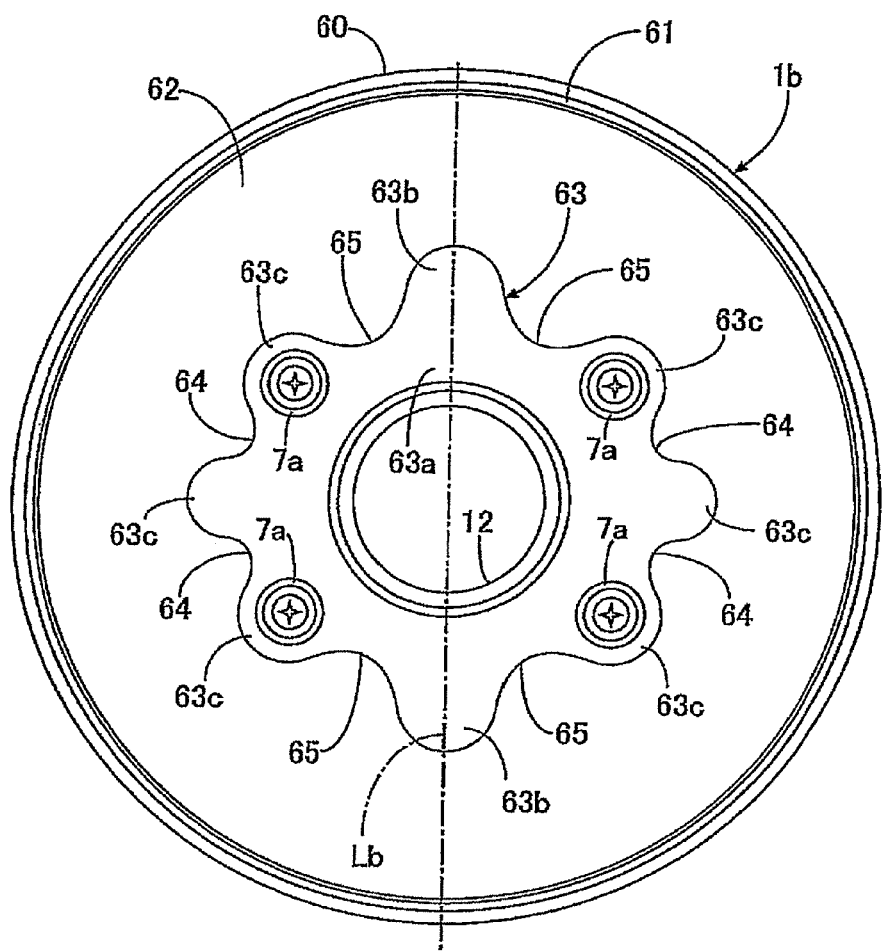
Figure 7:
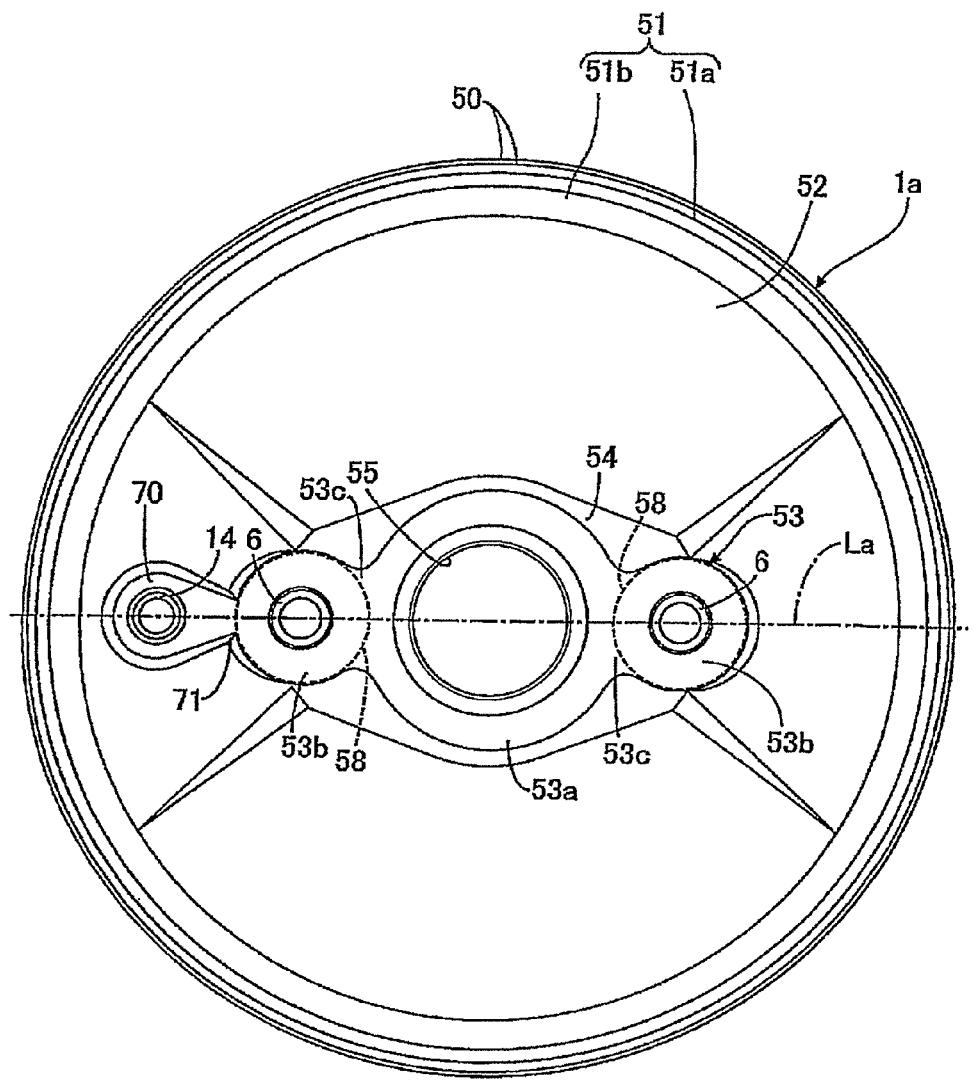

FIG. 1 is a vertical sectional view of a vacuum booster according to a first embodiment.
FIG. 2 is a perspective view of a front shell half.
FIG. 3 is a front view of the front shell half.
FIG. 4 is a sectional view taken along line IV-IV in FIG. 3.
FIG. 5 is a perspective view of a rear shell half.
FIG. 6 is a front view of the rear shell half.
FIG. 7 is a front view, corresponding to FIG. 3, of a front shell half according to a second embodiment.

Embodiments of the present invention will be hereinafter described with reference to the accompanying drawings.

A first embodiment of the invention will be described below with reference to FIGS. 1 to 6. As shown in FIG. 1, a booster shell 1 of a vacuum booster B is composed of a bowl-shaped front shell half 1a and rear shell half 1b whose confronting ends are connected to each other. The front shell half 1a and the rear shell half 1b are made of steel, and the rear shell half 1b is fastened to a vehicle body F with four bolts 7 (only one bolt 7 is shown in FIG. 1). A rear flange 45 of a rear portion of a cylinder body Ma of a master cylinder M is screwed to the front shell half 1a with a pair of bolts 6 (only one bolt 6 is shown in FIG. 1). The bolts 7 are fixed to the rear shell half 1b by caulking, and the bolts 6 are fixed to the front shell half 1a also by caulking.

A booster piston 4 is housed in the booster shell 1 so as to be able to reciprocate in the front-rear direction. The inside space of the booster shell 1 is partitioned into a front vacuum pressure room 2 and a rear operating room 3 by the booster piston 4 and a diaphragm 5 which is laid on and joined to the rear surface of the booster piston 4 and whose outer circumferential portion is sandwiched between outer circumferential portions of the front shell half 1a and the rear shell half 1b. The front vacuum pressure room 2 is connected to a vacuum pressure source V (e.g., the inside space of an intake manifold of an internal combustion engine) via a vacuum pressure introduction pipe 14 which is fastened to the front shell half 1a.

The booster piston 4 is formed by shaping a steel plate into a ring shape. A valve cylinder 10 made of synthetic resin is joined to central portions of the booster piston 4 and the diaphragm 5. A support cylindrical portion 12 which extends rearward is integral with the central portion of the rear shell half 1b, and the valve cylinder 10 is supported slidably by the support cylindrical portion 12 via a bearing member 9 and a sealing member 13.

A valve piston 18, an input rod 20 which is linked to the valve piston 18, and a control valve 38 which causes the operating room 3 to communicate with the vacuum pressure room 2 or the ambient air as the input rod 20 moves in the front-rear direction are disposed in the valve cylinder 10. A brake pedal P is linked to a rear end portion of the input rod 20.

The valve piston 18 is slidably inserted, by fitting, in a guide hole 11 which is formed in the valve cylinder 10. A front end portion of the valve piston 18 is formed into a reactive piston 17 with a neck portion 18a formed behind it, and a rear end portion of the valve piston 18 is formed into a flange-shaped air introduction valve seat 31. The valve cylinder 10 is formed with a ring-shaped vacuum pressure introduction valve seat 30 which is disposed around the air introduction valve seat 31 so as to be concentric with it. The input rod 20 is linked to the valve piston 18 swingably via a ball joint 20a.

A valve plug 34 is attached to the valve cylinder 10 by an expandable/contractible cylindrical valve holder 35 having a ring-shaped valve portion 34a which cooperates with the vacuum pressure introduction valve seat 30 and the air introduction valve seat 31. The entire valve plug 34 is molded with an elastic material such as rubber. The valve portion 34a is opposed to the vacuum pressure introduction valve seat 30 and the air introduction valve seat 31 so as to be able to be seated on them. A compressed valve spring 36 which urges the valve portion 34a in such a direction that it is seated on the vacuum pressure introduction valve seat 30 and the air introduction valve seat 31 is disposed between the valve portion 34a and the input rod 20. The vacuum pressure introduction valve seat 30, the air introduction valve seat 31, the valve plug 34, and the valve spring 36 thus constitute the control valve 38.

A compressed input return spring 41 is disposed between the valve holder 35 and the input rod 20. The input return spring 41 urges the input rod 20 in the retreat direction, and holds the valve holder 35 at a fixed position in the valve cylinder 10.

The valve cylinder 10 is formed with a first port 28 and a second port 29. The first port 28 has, at one end, an opening which is located in the vacuum pressure room 2 and also has, at the other end, an opening which is located outside the vacuum pressure introduction valve seat 30. The second port 29 has, at one end, an opening which is located in the operating room 2 and also has, at the other end, an opening which is located between the vacuum pressure introduction valve seat 30 and the air introduction valve seat 31.

The two respective ends of an expandable/contractible boot 40 which covers the valve cylinder 10 are attached to the rear end of the support cylindrical portion 12 and the input rod 20. A rear end portion of the boot 40 is formed with air introduction holes 39 which communicate with the inside of the valve plug 34. A filter 42 for filtering air that flows in through the air introduction holes 39 is sandwiched between the outer circumferential surface of the input rod 20 and the inner circumferential surface of the valve cylinder 10. The filter 42 is flexible so as not to obstruct a relative movement between the input rod 20 and the valve cylinder 10.

A key 32 which is in contact with the front surface of a stopper wall 19 of the support cylindrical portion 12 and defines retreat limit positions of the booster piston 4 and the input rod 20 is attached to the valve cylinder 10 so as to be movable in the axial direction in a prescribed range.

The valve cylinder 10 is provided with an operating piston 15 which project forward and a small-diameter cylinder hole 16 which penetrates through the operating piston 15 at its center. The reactive piston 17 is inserted, by fitting, in the small-diameter cylinder hole 16 slidably. The outer circumferential surface of the operating piston 15 is slidably fitted with a cup 21 which is partly filled with a flat elastic piston 22 which is opposed to the operating piston 15 and the reactive piston 17. While the vacuum booster B is not in operation, a prescribed gap is formed between the reactive piston 17 and the elastic piston 22.

An output rod 25 projects forward from the front surface of the cup 21. Therefore, the output rod 25 is supported slidably by the valve cylinder 10 via the cup 21. On the other hand, a rear end portion of a master piston Mb of a master cylinder M is slidably fitted in a fitting cylindrical portion 55 which is located at the center of the front shell half 1a, via a rear end portion of a cylinder body Ma of the master cylinder M. The output rod 25 is linked to the master piston Mb.

The operating piston 15, the reactive piston 17, the elastic piston 22, and the cup 21 constitute a reactive mechanism 24 for feeding back part of an output of the output rod 25 to the input rod 20.

A retainer 26 is provided so as to be in contact with the front end surfaces of the cup 21 and the valve cylinder 10. A compressed booster return spring 27 for urging the booster piston 4 and the valve cylinder 10 in the retreat direction is disposed between the retainer 26 and the front wall of the booster shell 1.

Next, the structure of the front shell half 1a of the booster shell 1 and a structure for screwing the front shell half 1a to the cylinder body Ma of the master cylinder M will be described with reference to FIGS. 2 to 4.

As shown in FIGS. 2 to 4, the front shell half 1a is provided with, in an integral manner, in order from the rear side, a stepped link cylindrical portion 50, a cylindrical circumferential wall 51 which is continuous with the front end of the link cylindrical portion 50, an end wall 52 which extends forward so as to be inclined inward in the radial direction from the front end of the circumferential wall 51, a flat front attachment portion 53 which is continuous with the front end of the end wall 52 and is to be screwed to the rear flange 45 of the cylinder body Ma of the master cylinder M, and the fitting cylindrical portion 55 which extends from a central portion of the front attachment portion 53 toward the rear shell half 1b so as to be able to be fitted with the rear end portion of the cylinder body Ma. As shown in FIG. 1, the link cylindrical portion 50 is linked to a front end portion of the rear shell half 1b and the diaphragm 5 is sandwiched between the link cylindrical portion 50 and an outer circumferential portion of the rear shell half 1b.

In this embodiment, the circumferential wall 51 is composed of a cylindrical portion 51a which is continuous with the link cylindrical portion 50 and a truncated-cone-shaped portion 51b which is continuous with the front end of the cylindrical portion 51a and decreases in diameter as the position goes forward. In the embodiment, the end wall 52 also has a truncated cone shape whose diameter decreases as the position goes forward.

A reinforcement wall 54 for increasing the rigidity of the front attachment portion 53 is formed between the end wall 52 and the front attachment portion 53 so as to form certain angles with the end wall 52 and the front attachment portion 53, respectively.

The flange 45 which is placed on the front attachment portion 53 and a positioning cylindrical portion 46 which projects from the rear end surface of the flange 45 and is fitted in the fitting cylindrical portion 55 are integral with each other and constitute a rear portion of the cylinder body Ma of the master cylinder M. A ring-shaped sealing member 56 is attached to the outer circumferential surface of the positioning cylindrical portion 46 so as to be in resilient, sliding contact with the inner circumferential surface of the fitting cylindrical portion 55.

The flat front attachment portion 53 which is screwed to the rear flange 45 of the cylinder body Ma has a central disc portion 53a which is concentric with the fitting cylindrical portion 55, plural side disc portions 53b which are disposed around the central disc portion 53a so as to be spaced from each other, and plural link portions 53c which connect the plural side disc portions 53b to the central disc portion 53a. In the first embodiment, the bolts 6 are inserted through the central portions of a pair of side disc portions 53b which are disposed on a diameter line La of the central disc portion 53a.

Each link portion 53c is narrowed so that its top and bottom edges are made closer to each other and curved smoothly.

A pair of ring-shaped reinforcement plates 58 are fastened to the inner surfaces of the side disc portions 53b of the front attachment portion 53 so as to be concentric with the bolts 6, respectively. The side disc portions 53b are formed in such a manner that their outer perimeters coincide with those of the reinforcement plates 58, respectively, when viewed perpendicularly to the front attachment portion 53. Each bolt 6 is inserted through the associated side disc portion 53b of the front attachment portion 53, and a wide-diameter head 6a of the bolt 6 is in contact with and is engaged with the associated reinforcement plate 58 and is fixed to the associated side disc portion 53b by caulking the latter. The bolts 6 thus project forward from the respective side disc portions 53b.

The front attachment portion 53 are screwed to the flange 45 by inserting the master piston Mb of the master cylinder M into the booster shell 1 through the fitting cylindrical portion 55, placing the flange 45 on the front attachment portion 53 while inserting the bolts 6 into respective bolt holes 47 of the flange 45, and rotating nuts 57 until they are tightly engaged with the respective bolts 6.

Next, the structure of the rear shell half 1b of the booster shell 1 and a structure for screwing the front shell half 1a to the vehicle body F will be described with reference to FIGS. 5 and 6.

As shown in FIGS. 5 and 6, the rear shell half 1b is provided with, in an integral manner, a stepped link cylindrical portion 60 which causes an outer perimeter portion of the diaphragm 5 to be sandwiched between itself and the link cylindrical portion 50 of the front shell half 1a when the rear shell half 1b is fitted into the link cylindrical portion 50, a cylindrical circumferential wall 61 which is continuous with and is located inside the front end of the link cylindrical portion 60, an end wall 62 which extends rearward from the rear end of the circumferential wall 61 so as to be inclined inward in the radial direction, a flat rear attachment portion 63 which is continuous with the rear end of the end wall 62 and is to be screwed to the vehicle body F, and a support cylindrical portion 12 which extends rearward from a central portion of the rear attachment portion 63 and is to support the valve cylinder 10.

The flat rear attachment portion 63 is formed in such a manner that plural first side disc portions 63b and plural second side disc portions 63c are arranged around a central disc portion 63a which is concentric with the support cylindrical portion 12 so as to be continuous with the central disc portion 63a. The plural first side disc portions 63b are spaced from each other, and the plural second side disc portions 63c are also spaced from each other. More specifically, a pair of first side disc portions 63b are disposed over and under the central disc portion 63a on a diameter line Lb of the support cylindrical portion 12. Six second side disc portions 63c are arranged around the central disc portion 63a (three second side disc portions 63c are located on each side of the diameter line Lb) so as to be spaced from each other. The second side disc portions 63c are smaller than the first side disc portions 63b.

Recesses 64 and 65 are formed between the first side disc portions 63b and the second side disc portions 63c so as to be recessed inward in the radial direction of the rear shell half 1b. The end wall 62 is waved along its circumferential direction so as to conform to the recesses 64 and 65.

The bolts 7 are inserted through central portions of four second side disc portions 63c which are arranged around the central disc portion 63a at equal intervals among the two first side disc portions 63b and the six second side disc portions 63c. Each bolt 7 is inserted through the associated second side disc portion 63c, and a wide-diameter head 7a of the bolt 7 is in contact with and is engaged with the inner surface of the associated second side disc portion 63c and is fixed to the associated second side disc portion 63c by caulking. The bolts 7 thus project rearward from the respective second side disc portions 63c.

The rear attachment portion 63 are screwed to the vehicle body F by placing the rear attachment portion 63 on the vehicle body F while inserting the bolts 7 into respective bolt holes 68 of the vehicle body F and rotating nuts 69 until they are tightly engaged with the respective bolts 7.

Next, a description will be made of the workings of the first embodiment. In a state that the vacuum booster B is not in operation, the key 32 which is attached to the valve cylinder 10 is in contact with the front surface of the stopper wall 19 of the rear shell half 1b. The rear end surface of the reactive piston 19 is in contact with the key 32, whereby the booster piston 4 and the input rod 20 are located at their retreat limit positions. In this state, the air introduction valve seat 31 presses the valve portion 34a of the valve plug 34 while being in close contact with the latter, and thereby separates the valve portion 34a slightly from the vacuum pressure introduction valve seat 30. As a result, the air introduction holes 39 do not communicate with the second port 29 and the first and second ports 28 and 29 communicate with each other. The vacuum pressure in the vacuum pressure room 2 is transmitted to the operating room 3 via the first and second ports 28 and 29, whereby the vacuum pressure room 2 and the operating room 3 are given the same pressure. The booster piston 4 and the valve cylinder 10 are kept at their retreat positions by the urging force of the booster return spring 27.

When the brake pedal P is stepped on to brake the vehicle and the input rod 20 is thereby advanced together with the valve piston 18 against the set force of the input return spring 41, the urging force of the valve spring 36 causes the valve portion 34a to be seated on the vacuum pressure introduction valve seat 30 and the air introduction valve seat 31 is separated from the valve plug 34. As a result, the first and second ports 28 and 29 come not to communicate with each other and the second port 29 comes to communicate with the air introduction holes 39 via the inside of the valve plug 34.

As a result, air that flows into the valve cylinder 10 through the air introduction holes 39 is introduced into the operating room 3 past the air introduction valve seat 31 and the second port 29, and makes the pressure in the operating room 3 higher than that in the vacuum pressure room 2. Given forward thrust produced by that pressure difference, the booster piston 4 advances against the force of the booster return spring 27 together with the valve cylinder 10, the operating piston 15, the elastic piston 22, the cup 21, and the output rod 25. The manipulation input of the input rod 20 is transmitted to the output rod 25 in an amplified manner and hence can operate the master piston Mb in a boosted manner.

The rear shell half 1b of the booster shell 1 is fastened to the vehicle body F with the bolts 7, and part of the forward drive thrust that is exerted on the master piston Mb by the output rod 25 acts on the front attachment portion 53 of the front shell half 1a via the flange 45 of the cylinder body Ma and the bolts 6. Therefore, at this time, strong tensile load acts on the booster shell 1 along its axis.

Incidentally, the reinforcement wall 54 is formed between the front attachment portion 53 and the end wall 52 of the front shell half 1a so as to form certain angles with them. Therefore, the rigidity of the front attachment portion 53 is increased by the reinforcement wall 54, whereby a strong joining state (by screwing) of the front attachment portion 53 and the flange 45 can be secured against the above tensile load.

Furthermore, in the front attachment portion 53, the pair of side disc portions 53b which are disposed on both sides of the central disc portion 53a at equal distances from the fitting cylindrical portion 55 are continuous with the central disc portion 53a which is concentric with the fitting cylindrical portion 55 which is fitted with the rear end portion of the cylinder body Ma. And the bolts 6 are inserted through the respective side disc portions 53b. Therefore, when local tensile loads act on the bolts 6 which are inserted through the respective side disc portions 53b, plastic deformation of the side disc portions 53b can be minimized because the areas of the flat portions around the screwing portions using the bolts 6, that is, the areas of the side disc portions 53b, are small. Therefore, the weight of the front shell half 1a, and hence the booster shell 1, can be reduced while the strength of the front attachment portion 53, that is, the front shell half 1a, is kept high.

The pair of side disc portions 53b are linked to the central disc portion 53a by the narrowed link portions 53c, respectively. Therefore, the areas of the flat portions around the screwing portions using the bolts 6, that is, the areas of the side disc portions 53b, are made even smaller and plastic deformation of the side disc portions 53b can be prevented more effectively.

In addition, since each link portion 53c is narrowed so as to form gently curved edges, the strength of the link portions 53c which link the side disc portions 53b to the central disc portion 53a can be made high.

The ring-shaped reinforcement plates 58 which are concentric with the bolts 6 are fastened to the inner surfaces of the pair of side disc portions 53b of the front attachment portion 53, respectively, and the side disc portions 53b are formed in such a manner that their outer perimeters coincide with those of the reinforcement plates 58, respectively, when viewed perpendicularly to the front attachment portion 53. Therefore, the areas of the flat portions adjacent to the reinforcement plates 58 are minimized while the strength of the side disc portions 53b is made even higher by the reinforcement plates 58. Plastic deformation of the side disc portions 53b can thus be prevented effectively.

The flat rear attachment portion 63 is formed in such a manner that the plural first side disc portions 63b and the plural second side disc portions 63c are arranged around the central disc portion 63a which is concentric with the support cylindrical portion 12 so as to be continuous with the central disc portion 63a. The plural first side disc portions 63b are spaced from each other, and the plural second side disc portions 63c are also spaced from each other. The bolts 7 are inserted through the central portions of the four second side disc portions 63c which are arranged around the central disc portion 63a at equal intervals among those first side disc portions 63b and six second side disc portions 63c. Therefore, when local tensile loads act on the bolts 7 which are inserted through the respective second side disc portions 63c, plastic deformation of the second side disc portions 63c can be minimized because the areas of the flat portions around the screwing portions using the bolts 6, that is, the areas of the second side disc portions 63c, are small. Therefore, the weight of the rear shell half 1b, and hence the booster shell 1, can be reduced while the strength of the rear attachment portion 63, that is, the rear shell half 1b, is kept high.

In the above-described first embodiment, each of the flat front attachment portion 53 of the front shell half 1a and the flat rear attachment portion 63 of the rear shell half 1b has the central disc portion 53a or 63a and the plural side disc portions 53b or 63b and 63c which are disposed around the central disc portion 53a or 63a so as to be continuous with the central disc portion 53a or 63a and to be spaced from each other. And the bolts 6 or 7 are inserted through at least a pair of side disc portions 53b or 63c among those plural side disc portions 53b or 63b and 63c. Alternatively, only one of the front attachment portion 53 and the rear attachment portion 63 may have the above shape.

A second embodiment of the invention will be described below with reference to FIG. 7. Members and portions having corresponding ones in the first embodiment are given, in FIG. 7, the same reference symbols as the latter and will not be described in detail.

The front attachment portion 53 of the front shell half 1a is screwed to the flange 45 of the cylinder body Ma of the master cylinder M by the pair of bolts 6 whose center axes are located on the diameter line La of the fitting cylindrical portion 55 (refer to the first embodiment). The front shell half 1a is formed with a flat pipe attachment portion 70 which is disposed on the diameter line La outside one of the pair of side disc portions 53b of the front attachment portion 53 and a flat neck portion 71 which is narrower than the side disc portions 53b and the pipe attachment portion 70 and links the one side disc portion 53b to the pipe attachment portion 70, in such a manner that the front surfaces of the pipe attachment portion 70 and the neck portion 71 are flush with the front surface of the front attachment portion 53. A proximal end portion of the vacuum pressure introduction pipe 14 is fastened to the pipe attachment portion 70.

According to the second embodiment, when a local tensile load acts on the vacuum pressure introduction pipe 14, plastic deformation of the pipe attachment portion 70 can be minimized because the area of the flat portion around the attachment portion, to which the vacuum pressure introduction pipe 14 is attached, of the front shell half 1a, that is, the area of the pipe attachment portion 70, is small. Therefore, the weight of the front shell half 1a, and hence the booster shell 1, can be reduced while the strength of the front shell half 1a is kept high.

Although the embodiments of the invention have been described above, the invention is not limited to them and various design modifications are possible without departing from the invention as claimed.

For example, instead of using the bolts 6 and/or 7, nuts may be buried in or fixed to at least one of the front attachment portion 53 and the rear attachment portion 63. The circumferential wall 51 of the front shell half 1a may have a simple cylindrical shape (i.e., the truncated-cone-shaped portion 51b is omitted).

What is claimed is:

1. A vacuum booster for a vehicular brake, the booster comprising:
   a booster shell comprising a front shell half and a rear shell half, the front shell half being shaped like a bowl opened on a rear side and having a flat front attachment portion screwed to a rear flange of a cylinder body of a master cylinder, the rear shell half being shaped like a bowl opened on a front side and having a flat rear attachment portion screwed to a vehicle body, the front shell half and the rear shell half being connected to each other;
   a fitting cylindrical portion which is fitted with a rear end portion of the cylinder body, is integral with the front shell half, and extends rearward from a central portion of the flat front attachment portion;
   a booster piston housed in the booster shell so as to be able to reciprocate in a front-rear direction;
   a diaphragm laid on and joined to a rear surface of the booster piston;
   a valve cylinder connected to central portions of the booster piston and the diaphragm; and a support cylindrical portion which is disposed concentrically with the fitting cylindrical portion so as to slidably support the valve cylinder, is integral with the rear shell half and extends rearward from a central portion of the flat rear attachment portion, a reinforcement wall for increasing a rigidity of the front attachment portion being formed between an end wall and the front attachment portion so as to form certain angles with the end wall and the front attachment portion, respectively, wherein at least one of the flat front attachment portion and the flat rear attachment portion has a central disc portion which is concentric with the fitting cylindrical portion and plural side disc portions which are disposed around the central disc portion so as to be continuous with the central disc portion and to be spaced from each other; and wherein bolts are inserted through at least a pair of side disc portions of the plural side disc portions, and further comprising:

plural link portions which connect the plural side disc portions to the central disc portion of the flat front attachment portion, the plural link portions being narrower at its outer edges than the plural side disc portions and the central disk portion of the flat front attachment portion at its outer edges.

2. The booster according to claim 1, wherein each of the plural link portions is narrowed in such a manner that the edges are curved.

3. The booster according to claim 1, further comprising ring-shaped reinforcement plates which are concentric with the bolts inserted through the side disc portions, respectively, and are fastened to inner surfaces of the side disc portions, respectively, wherein perimeter shapes of the side disc portions include portions following at least portions of perimeter shapes of the reinforcement plates, respectively.

4. The booster according to claim 1, further comprising ring-shaped reinforcement plates fastened to inner surfaces of each of the plural side disc portions of the flat front attachment portion, and outer perimeters of the plural side disc portions of the flat front attachment portion coincide with the reinforcement plates.

5. The booster according to claim 1, wherein the plural link portions are narrowed so that top and bottom edges of each link portion are made closer to each other than top and bottom edges of the central disc portion of the flat front attachment portion.

6. The booster according to claim 1, wherein the number of the disc portions of the flat front attachment portion is less than that of the flat rear attachment portion.

7. A vacuum booster for a vehicular brake, the booster comprising:

a booster shell comprising a front shell half and a rear shell half, the front shell half being shaped like a bowl opened on a rear side and having a flat front attachment portion screwed to a rear flange of a cylinder body of a master cylinder, the rear shell half being shaped like a bowl opened on a front side and having a flat rear attachment portion screwed to a vehicle body, the front shell half and the rear shell half being connected to each other;

a fitting cylindrical portion which is fitted with a rear end portion of the cylinder body, is integral with the front shell half, and extends rearward from a central portion of the flat front attachment portion;

a booster piston housed in the booster shell so as to be able to reciprocate in a front-rear direction;

a diaphragm laid on and joined to a rear surface of the booster piston;

a valve cylinder connected to central portions of the booster piston and the diaphragm; and a support cylindrical portion which is disposed concentrically with the fitting cylindrical portion so as to slidably support the valve cylinder, is integral with the rear shell half and extends rearward from a central portion of the flat rear attachment portion, wherein at least one of the flat front attachment portion and the flat rear attachment portion has a central disc portion which is concentric with the fitting cylindrical portion and plural side disc portions which are disposed around the central disc portion so as to be continuous with the central disc portion and to be spaced from each other; and wherein bolts are inserted through at least a pair of side disc portions of the plural side disc portions, wherein the front attachment portion is screwed to the rear flange by a pair of bolts whose center axes are located on a diameter line of the fitting cylindrical portion, wherein the front shell half is formed with a flat pipe attachment portion which is disposed on the diameter line outside one of the pair of side disc portions and a flat neck portion which is narrower than the side disc portions and the pipe attachment portion and links the one side disc portion to the pipe attachment portion, in such a manner that front surfaces of the pipe attachment portion and the neck portion are flush with the front surface of the front attachment portion, and wherein a proximal end portion of a vacuum pressure introduction pipe for introducing vacuum pressure into a vacuum pressure room formed between the front shell half and a combination of the booster piston and the diaphragm is fastened to the pipe attachment portion.

8. A vacuum booster for a vehicular brake, the booster comprising:

a booster shell comprising a front shell half and a rear shell half, the front shell half being shaped like a bowl opened on a rear side and having a flat front attachment portion screwed to a rear flange of a cylinder body of a master cylinder, the rear shell half being shaped like a bowl opened on a front side and having a flat rear attachment portion screwed to a vehicle body, the front shell half and the rear shell half being connected to each other;

a fitting cylindrical portion which is fitted with a rear end portion of the cylinder body, is integral with the front shell half, and extends rearward from a central portion of the flat front attachment portion;

a booster piston housed in the booster shell so as to be able to reciprocate in a front-rear direction;

a diaphragm laid on and joined to a rear surface of the booster piston;

a valve cylinder connected to central portions of the booster piston and the diaphragm; and a support cylindrical portion which is disposed concentrically with the fitting cylindrical portion so as to slidably support the valve cylinder, is integral with the rear shell half and extends rearward from a central portion of the flat rear attachment portion, a reinforcement wall for increasing a rigidity of the front attachment portion being formed between an end wall and the front attachment portion so as to form certain angles with the end wall and the front attachment portion, respectively, wherein at least one of the flat front attachment portion and the flat rear attachment portion has a central disc portion which is concentric with the fitting cylindrical portion and plural side disc portions which are disposed around the central disc portion so as to be continuous with the central disc portion and to be spaced from each other; and wherein bolts are inserted through at least a pair of side disc portions of the plural side disc portions, wherein the front shell half is formed with a flat pipe attachment portion which is disposed on a diameter line outside one of the pair of side disc portions.

9. The booster according to claim 8, wherein the front shell half is formed with a flat neck portion which is narrower than the plural side disc portions and the pipe attachment portion.

10. The booster according to claim 9,
wherein the flat neck portion links the one side disc portion to the pipe attachment portion, and
wherein front surfaces of the pipe attachment portion and the flat neck portion are flush with a front surface of the front attachment portion.

11. The booster according to claim 8, wherein a proximal end portion of a vacuum pressure introduction pipe for introducing vacuum pressure into a vacuum pressure room formed between the front shell half and a combination of the booster piston and the diaphragm is fastened to the flat pipe attachment portion.

12. A vacuum booster for a vehicular brake, the booster comprising:
a booster shell comprising a front shell half and a rear shell half, the front shell half being shaped like a bowl opened on a rear side and having a flat front attachment portion screwed to a rear flange of a cylinder body of a master cylinder, the rear shell half being shaped like a bowl opened on a front side and having a flat rear attachment portion screwed to a vehicle body, the front shell half and the rear shell half being connected to each other;
a fitting cylindrical portion which is fitted with a rear end portion of the cylinder body, is integral with the front shell half, and extends rearward from a central portion of the flat front attachment portion;
a booster piston housed in the booster shell so as to be able to reciprocate in a front-rear direction;
a diaphragm laid on and joined to a rear surface of the booster piston;
a valve cylinder connected to central portions of the booster piston and the diaphragm; and
a support cylindrical portion which is disposed concentrically with the fitting cylindrical portion so as to slidably support the valve cylinder, is integral with the rear shell half and extends rearward from a central portion of the flat rear attachment portion,
wherein the flat rear attachment portion comprises a central disc portion which is concentric with the fitting cylindrical portion and plural side disc portions which are disposed around the central disc portion so as to be continuous with the central disc portion and to be spaced from each other;
wherein bolts are inserted through at least a pair of side disc portions of the plural side disc portions;
wherein the central disc portion of the flat rear attachment portion concentric with the fitting cylindrical portion,
wherein an end wall is waved so as to correspond to a circumferential shape of the rear attachment portion,
wherein second side disc portions are smaller than first side disc portions as measured about its circumference.

13. The booster according to claim 12, wherein there are less side disc portions of the flat front attachment portion than the flat rear attachment portion.

14. The booster according to claim 13, wherein
the bolts are inserted through central portions of selected ones of second side disc portions, and
the selected second side disc portions are arranged around the central disc portion.

15. The booster according to claim 14, wherein the bolts are fixed to the selected ones of the second side disc portions by caulking.

16. The booster according to claim 12, wherein recesses are formed between first side disc portions and second side disc portions so as to be recessed inward in a radial direction of the rear shell half with the end wall being waved along its circumferential direction so as to conform to the recesses.

17. The booster according to claim 12, wherein the bolts are inserted through central portions of four second side disc portions which are arranged around the central disc portion at equal intervals.

* * * * *